(12) United States Patent
Haven et al.

(10) Patent No.: US 6,877,882 B1
(45) Date of Patent: Apr. 12, 2005

(54) ILLUMINATION SYSTEM FOR A PROJECTION SYSTEM

(75) Inventors: Thomas J. Haven, Portland, OR (US); Rolf S. Vatne, Portland, OR (US)

(73) Assignee: Delta Electronics, Inc., Taipei (TW)

( * ) Notice: Subject to any disclaimer, the term of this patent is extended or adjusted under 35 U.S.C. 154(b) by 9 days.

(21) Appl. No.: 10/387,787

(22) Filed: Mar. 12, 2003

(51) Int. Cl.$^7$ .............................. F21V 7/00
(52) U.S. Cl. ............... 362/308; 362/310; 362/268; 362/309; 362/331; 362/521; 362/298; 362/299; 359/463; 359/599
(58) Field of Search .................. 362/308, 310, 362/268, 309, 331, 521, 298, 299; 353/31, 33, 34, 22; 359/599, 615, 813, 463

(56) References Cited

U.S. PATENT DOCUMENTS

| | | | |
|---|---|---|---|
| 5,098,184 A | 3/1992 | van den Brandt et al. | 353/102 |
| 5,465,175 A * | 11/1995 | Woodgate et al. | 359/463 |
| 6,048,081 A * | 4/2000 | Richardson | 362/307 |
| 6,196,699 B1 | 3/2001 | Stanton | 362/235 |
| 6,307,601 B1 | 10/2001 | Kakuda et al. | 349/5 |
| 6,431,739 B1 | 8/2002 | Chuang | 362/558 |
| 6,454,440 B1 | 9/2002 | Yamamoto | 362/293 |
| 6,464,375 B1 * | 10/2002 | Wada et al. | 362/268 |

* cited by examiner

*Primary Examiner*—Stephen Husar
*Assistant Examiner*—Bertrand Zeade
(74) *Attorney, Agent, or Firm*—Patent Law Group LLP; Carmen C. Cook

(57) ABSTRACT

An illumination system for illuminating an object includes a light source and a lens array system. The light source includes an illumination element emitting light rays and surrounded by a parabolic reflector. The lens array system includes a first lens array plate and a second lens array plate. The first lens array plate includes a matrix of lenslets where, in one embodiment, each lenslet has a shape matching the aspect ratio of the object to be illuminated. The second lens array plate includes a radial pattern of wedge shaped lenslets each corresponding to a lenslet in the first lens array plate. Each wedge shaped lenslet in the second lens array plate has dimensions that are selected to provide a radial and theta collection angles matching the maximum divergence angle of the light source and the maximum divergence angles of the corresponding lenslet in the first lens array plate.

22 Claims, 6 Drawing Sheets

ILLUMINATION SYSTEM FOR A PROJECTION SYSTEM

FIELD OF THE INVENTION

The invention relates to an illumination system for illuminating an object and, in particular, to an illumination system with improved light collection for use in digital projectors.

DESCRIPTION OF THE RELATED ART

Data projectors, also known as digital projectors, are used for projecting images, usually color images, onto a screen. These projectors generally employ one of two types of data projection technologies. First, there are projectors using liquid crystal display (LCD) panels that act as the image forming device. Second, there are projectors using reflective digital micromirror device (DMD) chips. DMD chips are silicon based chips having movable microelectromechanical mirrors constructed thereon that act as the image forming device. The latter type of projectors is sometimes referred to as DMD projectors or digital light processing (DLP) projectors.

Front projectors using a single 0.7-inch diagonal DMD panel are known. The single-chip projectors employ a frame sequential method to produce full color images. The typical single-chip DMD front projector uses a light source including a single UHP (ultra high pressure) lamp with an elliptical reflector having with an illumination cone angle of about f/1.0. The eccentricity of the elliptical reflector is usually about 0.77 or less. Currently, commercially available UHP lamps with arc length of 1.5 mm or less are limited to approximately 250 to 300 watts of power. The power and the arc length of the lamp are primary factors in determining the maximum brightness of the single panel DMD projectors. Using UHP lamp of 250 to 300 watts of power, conventional single-chip DMD projector systems have been able to obtain high brightness with good light collection efficiency. Typically, the engine efficiency is greater than 10 lumens per watt.

Front projectors using three DMD panels are also known. In the three-chip projectors, each DMD panel is disposed to display one primary color such that the frame sequential method for a full color display is not needed. The three-chip projector realizes advantages over the single chip configuration in terms of additional brightness and improved color saturation. Conventional three-chip front projectors have used larger DMD panels, such as 1.1 inch or 0.9 inch diagonal panels. Typical applications to date for the three-chip front projectors have been in large venues that require more light input than single chip projectors. Therefore, the three-chip front projectors usually use high power Xenon arc lamps as a light source. Typically, the Xenon arc lamps used in the three-chip front projectors have power ranging from 1.2 kwatts to 5 kwatts.

To reduce the total system cost and to reduce the size of the projector, it is desirable to implement a three-chip DMD projector using smaller DMD panels, such as 0.7 inch panels. When the size of the panel is reduced, the engine optics can be reduced accordingly. If engine optics reduction is done in the same proportion as the panel reduction, for example, from 0.9 inch to 0.7 inch, the light collection efficiencies will be maintained. One of the dimensions that needs to be scaled in the proportional reduction is the arc gap of the light source. For example, a Xenon arc lamp with an arc gap of 1.8 mm would need the arc gap to be scaled down to 1.4 mm.

Typical applications for smaller panel projectors include smaller venues where images are displayed on slightly smaller screens and thus, the total light output requirement is also reduced. For these applications, the light source used is typically xenon lamps at the lower end of the typical power range, such as 1.2 kW or 1.6 kW rather than 3 kW or 5 kW.

However, to implement the smaller panel projectors, it is desirable to make the projector smaller and less heavy and thus, it is desirable to substitute the Xenon arc lamp with a Mercury arc lamp. Mercury lamps are desirable because Mercury lamps are about two times more efficient in producing light than xenon arc lamps. For instance, a 600 W mercury arc lamp with a 1.4 mm arc gap would produce the same light as the larger xenon arc lamp described earlier. However, high power (such as 600 watt) UHP lamps with short arc lengths are currently not commercially available. UHP lamps are generally available only in less than 300 watts of power and 1.3 to 1.8 mm arc lengths.

To obtain adequate brightness with mercury arc lamps for a three-chip small-panel-size DMD projector system, dual lamp systems have been proposed. A straightforward approach would use elliptical reflectors side by side, cutting away parts of each reflector to maintain illumination cone angle requirements of the engine.

A second method utilizes side by side parabolic lamps in conjunction with conventional lens arrays, as used in current LCD projectors. Conventional LCD lens arrays use rectangular lenslet elements. The rectangular lenslet shape is a requirement because it allows, in combination with another optical element, unpolarized light to be converted to polarized light during the light collection process. However, both of these dual lamp collection systems still have low collection efficiencies for 0.7 inch DMD panels due to the two fold increase in beam cross section relative to a single lamp design. The extra space requires the arc imaging location, or light collection area, to be further away from the arcs in the dual lamp system than it could be in a single lamp configuration. The added throw distance (between the arc and the imaging location) causes the imaged arc to have a large spot size in both the elliptical and parabolic systems described above. Having a smaller collection aperture necessitated by the smaller DMD panel renders both dual lamp systems with undesirably low collection efficiencies.

Therefore, it is desirable to provide an illumination system with improved light collection. Such an illumination system can be used in a reduced panel size three-chip DMD projector to realize brightness levels and efficiencies comparable to larger panel size three-chip DMD projector systems using single Xenon arc lamps.

SUMMARY OF THE INVENTION

According to one embodiment of the present invention, an illumination system for illuminating an object includes a light source and a lens array system. The light source includes an illumination element emitting light rays and surrounded by a parabolic reflector for directing the light rays towards the lens array system. The lens array system collects and focuses the incident light rays from the light source. The lens array system includes a first lens array plate and a second lens array plate. The first lens array plate includes a matrix of lenslets. In one embodiment, each lenslet in the first lens array plate has a shape matching the aspect ratio of the object to be illuminated. The second lens array plate includes a radial pattern of wedge shaped lenslets each corresponding to a lenslet in the first lens array plate.

The second lens array plate superimposes images of the first lens array plate on the object to be illuminated. Each wedge shaped lenslet in the second lens array plate has dimensions that are selected to provide a radial and theta collection angle matching the maximum divergence angle of the light source and the maximum divergence angles of the corresponding lenslet in the first lens array plate.

According to another embodiment of the present invention, the object to be illuminated is a light collection aperture having a first collection cone angle and the second lens array plate of the lens array system has dimensions selected to fit substantially all the transmitted light within the first collection cone angle of the light collection aperture.

According to one aspect of the present invention, the illumination system is applied in a projection system including three DMD panels. The illumination system for the three DMD panels is arranged in a dual lamp configuration whereby the light source includes two illumination elements each surrounded by a parabolic reflector. The projection system includes two lens array systems whereby light from each illumination element is directed to a respective lens array system for light collection. The second lens array plate in both lens array systems includes wedge shaped lenslets arranged in a radial pattern whereby each wedge shaped lenslet corresponds to a specific lenslet in the first lens array.

The present invention is better understood upon consideration of the detailed description below and the accompanying drawings.

DETAILED DESCRIPTION OF THE PREFERRED EMBODIMENTS

In accordance with the principles of the present invention, an illumination system for use in a digital projector includes a light source emitting a source of white light and a lens array system for collecting the emitted light. The light source includes a light emitting element, such as a lamp, and a parabolic reflector, concentrating and directing light onto the lens array system. The lens array system includes a first lens plate having an array of rectangularly shaped lenslets and a second lens plate having a radially arranged array of wedge shaped lenslets. There is a one to one correspondence between lenslet elements in the first lens plate and the lenslet elements of the second lenslet plate. Each of the radially oriented wedge shaped lenslets in the second lens plate has dimensions determined by the maximum beam divergence angle of the light source and the maximum divergence angle of the corresponding light emitting element in the first lens plate. The maximum beam divergence angles for the light source and for each lenslet element in the first lens plate can be calculated and used to determine the minimum physical size of the corresponding radial lenslets in the second lens plate without sacrificing light collection. Moreover, the illumination system keeps the entire spacing of the lamps, the lens arrays and the light collection aperture to as small a distance as possible which further ensures maximum light collection. In this manner, the lens array system functions as a highly efficient light collection device for collecting a majority of the light emitted from the light source.

Figure 1:
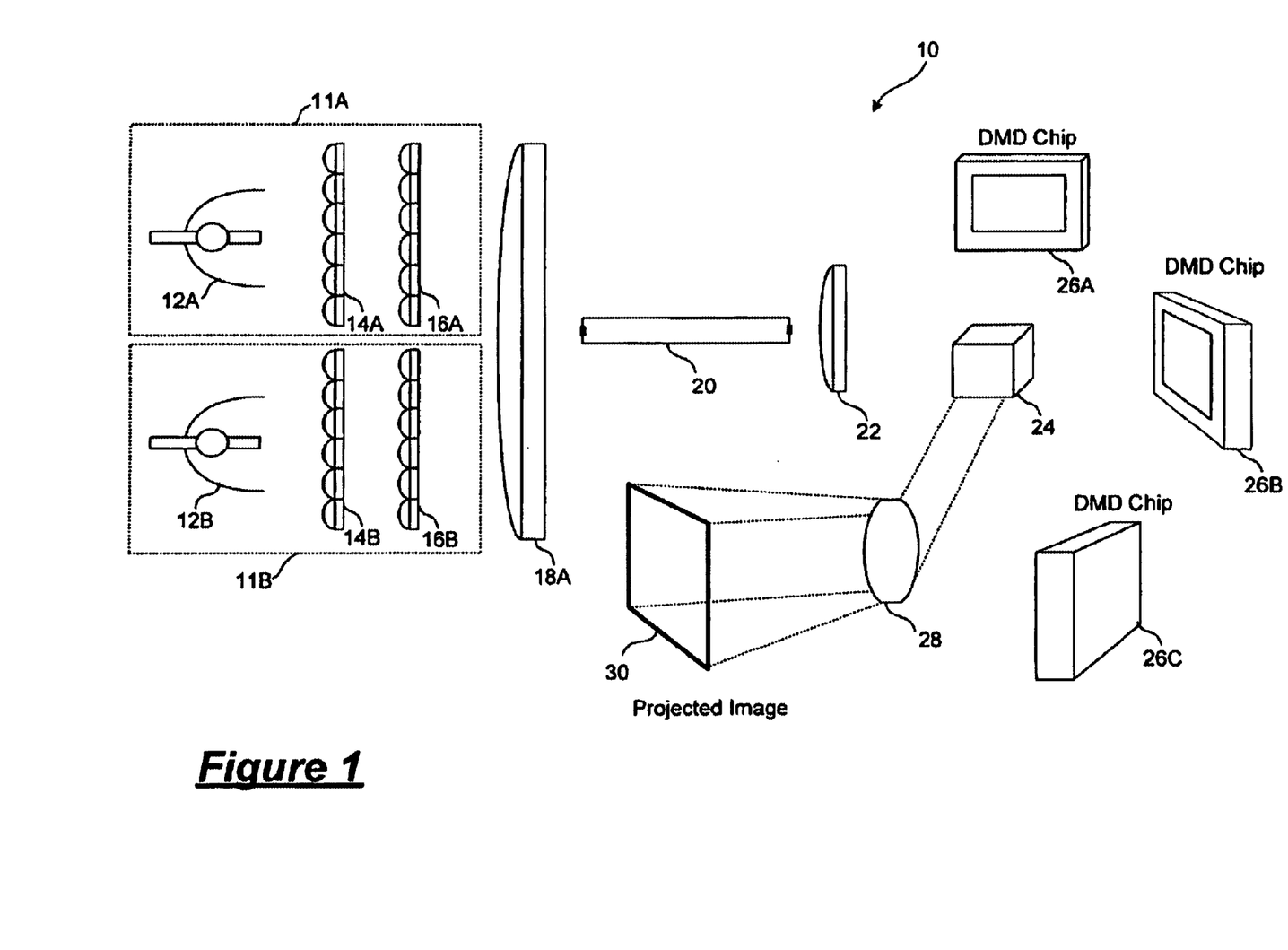
FIG. 1 is a system diagram illustrating an illumination system according to one embodiment of the present invention being incorporated in a dual lamp, three-chip DMD projector.

FIG. 1 is a block diagram illustrating the illumination system according to one embodiment of the present invention being incorporated in a dual lamp three-chip DMD projector. The use of the illumination system of the present invention in a dual-damp three-chip DMD projector is illustrative only and is not intended to be limiting. The illumination system of the present invention can be used in any digital projectors for providing an illumination source with high brightness and high collection efficiency. However, the illumination system of the present invention makes possible the construction of three-chip DMD projectors using 0.7 inches DMD panels and currently commercially available UHP lamps of 250–300 watts of power. Specifically, when the illumination system of the present invention is used in a dual lamp configuration and applied to a three-chip DMD projector, the DMD projector can display images with a brightness level comparable to projectors using larger panels and Xenon arc lamps. However, the illumination system of the present invention may also be used in a single lamp configuration, such as for use with a single-chip digital projector, as will be described in more detail below.

As a further note, FIG. 1 is intended to illustrate the major components in a dual lamp three-chip DMD projector and the relative position of the components in light path and the projected image path. The components in FIG. 1 and their relative positions are not drawn to scale. Furthermore, the DMD projector may include other components, such as additional condenser lenses, not shown in FIG. 1.

Referring to FIG. 1, to implement the dual lamp configuration, DMD projector 10 includes a pair of illumination systems 11A and 11B. In the dual lamp configuration of the present embodiment, the two illumination systems are placed adjacent each other so that the light output from each illumination system can be summed to provide a sufficiently bright light source for the DMD panels. For instance, two lamps with 300 watts power each can provide a comparable amount of collected light as would a single 600 watt lamp.

Illumination system 11A includes a light source 12A and a set of lens arrays 14A and 16A as the light collection device. In the present embodiment, light source 12A is an UHP lamp with 300 watts of power and an arc length of 1.3 mm. The UHP lamp is placed in a parabolic reflector with a focal length of 7 mm. In order for the reflector to capture most of the emitted light from the lamp, the lamp is positioned along the z-axis of the parabolic reflector.

Light emitted from light source 12A is directed towards and incident on the first lens array plate 14A. The first lens array plate 14A operates to image the arc of the lamp onto the second lens array plate 16A. The second lens array plate images the first lens array plate 14A onto a desired light collection aperture. The desired light collection aperture can be the DMD panels or an intermediate light integrating device which device shapes or homogenizes the light before the light is projected onto the DMD panels. By using a set of lens arrays and a condenser lens, it is possible to overlay all the images of the first lens array plates onto a single location (such as at the DMD panel or the desired light collection aperture) such that an averaging of the light input from the light source is achieved.

In the present embodiment, second lens array plate 16A, with the help of a condenser lens 18, superimposes images of first lens array plate 14A into a light integrator 20. Specifically, each lenslet in second lens array plate 16A images the corresponding image from first lens array plate 14A onto light integrator 20. Condenser lens 18 is optional and is often included to aid second lens array plate 16A in accurately positioning the superimposed images. Integrator 20 operates to homogenize the light output from illumination system 11A. Integrator 20 can be a rod integrator or a tunnel integrator. The homogenized light output is projected onto another condenser lens 22.

The second illumination system 11B of projector 10 is constructed in the same manner as illumination system 11A. Thus, light from light source 12B is projected through a set of lens array 14B and 16B and directed to condenser lens 18. The light output from second illumination system 11B is thus summed with the light output from first illumination system 11A.

In the present embodiment, projector 10 includes three DMD panels, one for displaying images in each of the three primary color components of the light spectrum. Thus, condenser lens 22 projects light into a color separating device 24 operating to split the white light into three primary color components. Color separating device 24 can be a prism or a set of dichroic mirrors. Each of the primary color light components is then projected onto a respective DMD panels 26A, 26B and 26C. DMD panels 26A, 26B and 26C modulate the incident light to form the image to be displayed. The image light reflected from each of the DMD panels are combined and superimposed at a projection lens assembly 28. Projection lens assembly 28 projects the combined color image onto a screen 30 for display. Projection lens assembly 28 usually includes a system of lenses for projecting, focusing and magnifying the image light.

Figure 5:
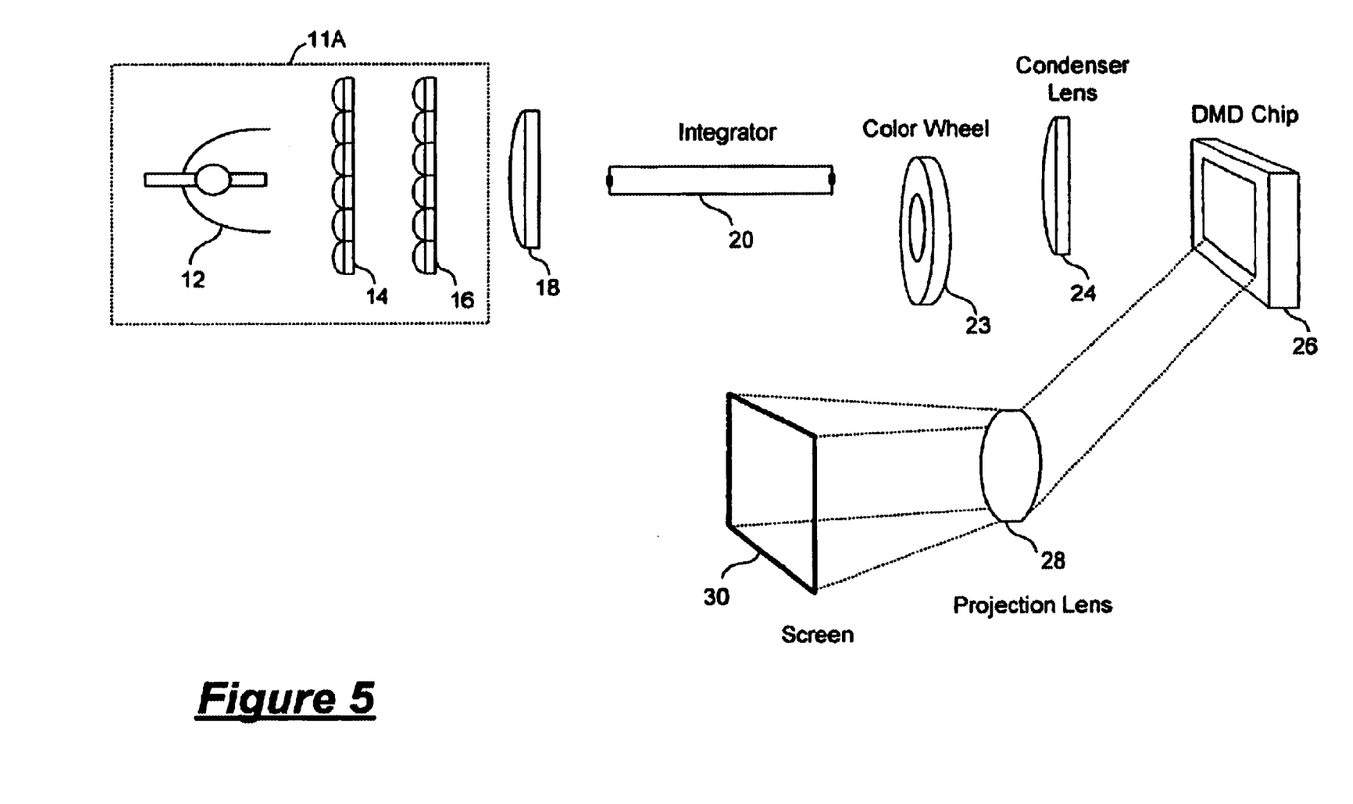
FIG. 5 is a system diagram illustrating an illumination system according to one embodiment of the present invention being incorporated in a single lamp, single-chip DMD projector.

In other embodiments, the illumination system of the present invention can be used in a single lamp, single chip DMD projector system. FIG. 5 is a system diagram illustrating an illumination system according to another embodiment of the present invention where the illumination system is incorporated in a single-lamp, single-chip DMD projector. Referring to FIG. 5, illumination system 11 is constructed in the same manner as illumination system 11A. When projector 100 is a single-chip DMD projector, a full color image is produced by using a spinning color wheel 23 operated in accordance with the conventional frame sequential color method. Thus, light from light source 12, after being collected by lens array plates 14 and 16 and homogenized by integrator 20, is directed to spinning color wheel 23 for sequentially generating colored lights which are then directed to the single DMD chip 26. The use of a color wheel for generating full color images using a single DMD chip is well known in the art and will not be further described.

Having described the configuration and operation of dual lamp three-chip DMD projector 10 and single-lamp single-chip DMD projector 100, the construction of the lens array system in the illumination devices will now be described.

Figure 2:
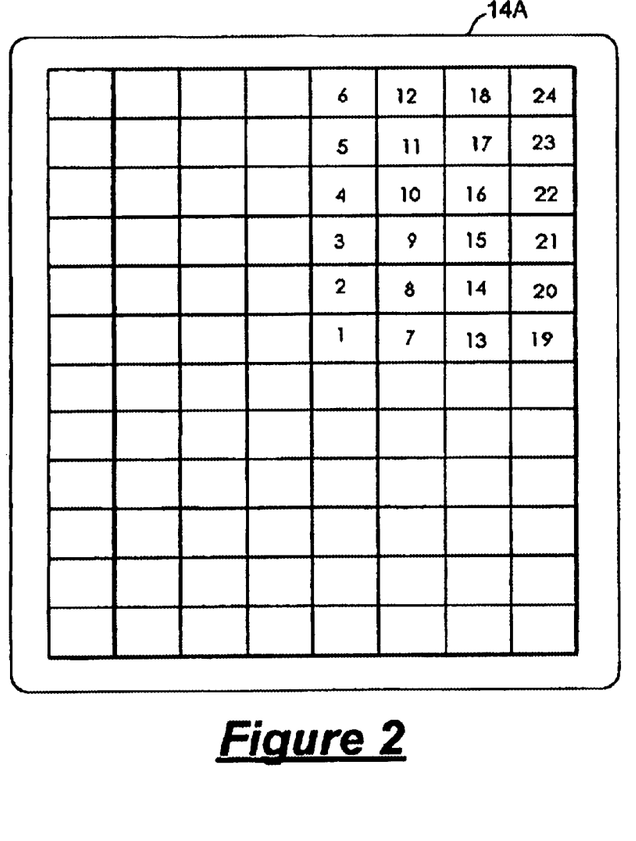
FIG. 2 is a diagram illustrating the lenslet pattern for the first lens array plate of the light collection device according to one embodiment of the present invention.

Referring to illumination system 11A, first lens array plate 14A is designed to include lenslets that match the aspect ratio of the DMD panel or the input aperture of the intermediate light integrating device (such as integrator 20). Typically, first lens array plate 14A includes lenslets arranged in a rows and columns configuration, also referred to as a matrix configuration. FIG. 2 is a diagram of a first lens array plate according to one embodiment of the present invention. In the present embodiment, first lens array plate 14A includes 12 rows and 8 columns of lenslets. Each lenslet has a dimension of 6.0×4.5 mm and a focal length of 90 mm. The size of lens array plate 14A and the dimension of the lenslets are illustrative only and exact number of lenslets and the exact dimensions of each lenslet are not critical to the practice of the present invention.

The inventors of the present invention recognize that the images of the arc projected by the first lens array plate onto the second lens array plate assumes a radial pattern due to beam divergence associated with the finite arc length of the lamp. Thus, the inventors recognize that by shaping the lenslets in the second lens array plate to match the image pattern of the arc projected by the first lens array, the second lens array plate 16A can capture a majority of the light imaged by the first lens array plate 14A, thereby increasing the collection efficiency of the illumination system and decreasing the overall dimensions of the second lens array plate.

Figure 4:
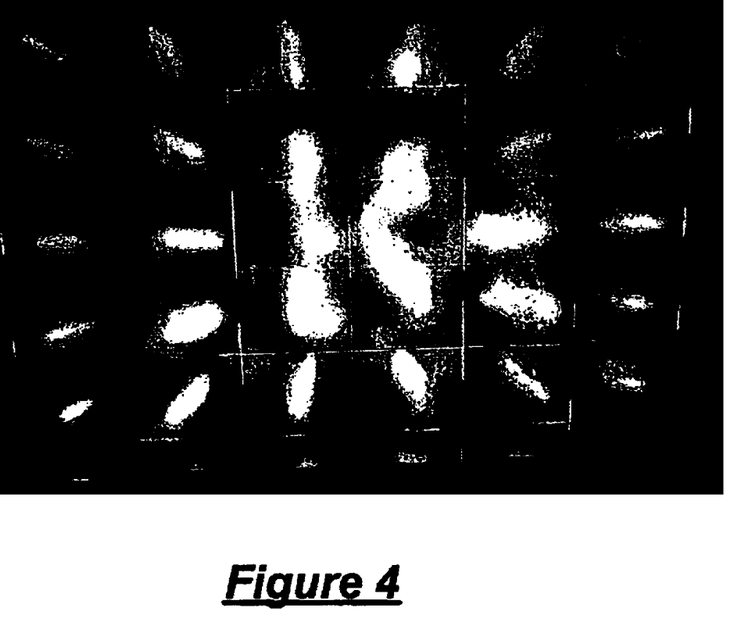
FIG. 4 is an actual image of light beams from a light source projected by the first lens array plate on a second lens array.

FIG. 4 is an actual image of the arc of light source 12A projected by the first lens array plate onto a second lens array plate. For the purpose of the present illustration, the second lens array plate has the conventional rows and columns configuration of lenslets. In the present illustration, each lenslet in the first lens array plate is an 8.2×6.15 mm rectangular element. Each lenslet in the first lens array forms an image of the arc on a corresponding lenslet in the second lens array. Because of the position of the lenslets pairs relative to the arc in the lamp, the arc images form a radial pattern around the center of the second lens array. The dark spaces between the arc images represent areas of little light transmission. The dark spaces are thus wasted space and need to be better utilized in order to maximize the light collection.

Figure 3:
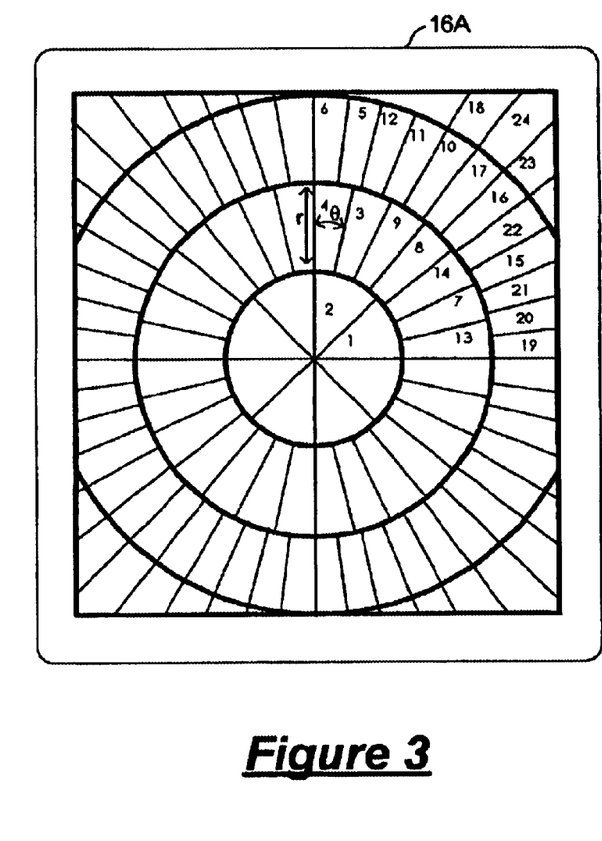
FIG. 3 illustrates the lenslet pattern of the second lens array plate of the light collection device according to one embodiment of the present invention.

In accordance with the present invention, the second lens array plate 16A of the illumination system has lenslets that are arranged to match the beam divergence of the arc projected through the first lens array so that the second lens array plate 16A can operate to capture all of the light projected by lens array plate 14A. FIG. 3 illustrates the lenslet pattern of the second lens array according to one embodiment of the present invention. Referring to FIG. 3, second lens array plate 16A includes radially arranged pattern of wedge shaped lenslets. The lenslets are either shaped as a segment of a circle or a segment of a ring and are referred herein as having a "wedge" shape. Each wedge shaped lenslet is shaped to best match the image pattern of the arc projected by the first lens array plate. There is a one-to-one correspondence with lenslets in the first lens array plate and lenslets in the second lens array. Thus, the arc images formed by the first lens array are directed to the corresponding lenslets in the second lens array. To illustrate the 1:1 correspondence, a section of the lenslets in first lens array plate 14A in FIG. 2 is numbered and the corresponding lenslets in the second lens array plate 16A in FIG. 3 are numbered accordingly.

By using the lenslet pattern shown in FIG. 3, the light intensity transmitted through the lens array system as a function of total lens array area is increased. This allows the surface area of the second lens array to be as small as possible without sacrificing light collection. Keeping the size of the second lens array small is essential because the light entering the light collection aperture (e.g. the integrator 20) must be within a certain defined illumination cone angle. The illumination cone is defined by the rest of the optics in the engine. In the present illustration, the cone angle is 30 degrees, or about f/1.0. Second lens array plate 16A having radial pattern lenslets can have a compact size such that all the transmitted light can fit within the illumination cone angle of the light collection aperture.

The second lens array plate 16A having the radial pattern of lenslets as shown in FIG. 3 is capable of capturing more light per given area than the conventional lens array systems when both the first and second lens array includes a matrix of rectangularly shaped lenslets. If the second lens array has rectangular elements, there is wasted space between the focused spots on the elements, as shown in FIG. 4. In order to collect all the light the rectangular lenslet elements need to be made larger thereby increasing the total size of the second lens plate. If the second lens plate exceeds the dimensions of the collection cone angle requirement, then light outside the cone cannot be collected and used by the engine optics and is thus wasted. Thus, the conventional lens array design has poor light collection.

In the present embodiment, lens array plates 14B and 16B of illumination system 11B is constructed in the same manner as lens array plates 14A and 16A. Thus, lens array plate 14B has lenslets arranged in rows and columns as shown in FIG. 2 and lens array plate 16B has lenslets arranged in a radial pattern as shown in FIG. 3.

In the present embodiment, first and second lens arrays are separated by 90 mm. The separation is selected to meet a specific magnification requirement. Specifically, the separation is selected to match the image of the lenslet in the first array to the intended light collection aperture, i.e., the input aperture of integrator 20. In this case the size of the lenslet is 6.0×4.5 mm and the intended aperture is also 6.0×4.5 mm. The image size can be made bigger or smaller by varying the separation distance between the first lens array plate and the second lens array plate. Thus, if the separation is set to 45 mm and the focal lengths are suitably selected, the image size projected by the second lens array would double. In the present embodiment, with a 90 mm separation distance, an image size of 6.0×4.5 mm in diameter is attained.

The illumination system of the present invention utilizes a set of specially constructed lens arrays to maximize the light collection efficiency. The illumination system of the present invention, when applied for use in a digital projector, achieves advantages not attainable in conventional projectors. First, the set of specially constructed lens array is capable of increasing the light collection efficiency such that almost all the light generated by the light source can be collected. Thus, the illumination system of the present invention improves the overall light throughput of the projection system. Second, in the present embodiment, by using a UHP lamp with a parabolic reflector, the projected image from the illumination system can have a very small spot size which size is not attainable in a dual elliptical lamp system, where space limitations force a large spot size.

According to one aspect of the present invention, the dimensions of the wedge shaped lenslets in the second lens array are determined by calculating the maximum divergence angle of the light source (e.g., the UHP lamps 12A and 12B) and the maximum divergence angle of the lenslets in the first lens array and matching the collection angle of the lenslets in the second lens array to the two maximum divergence angles. Furthermore, the dimensions of the lenslets are also optimized so that the size of the second lens array is small enough to fit within the collection cone angle of the light collection aperture (e.g. integrator 20) of the projection system. The process for determining the dimension of the wedge shaped lenslets in the second lens array of the lens array system will now be described in detail.

Figure 6:
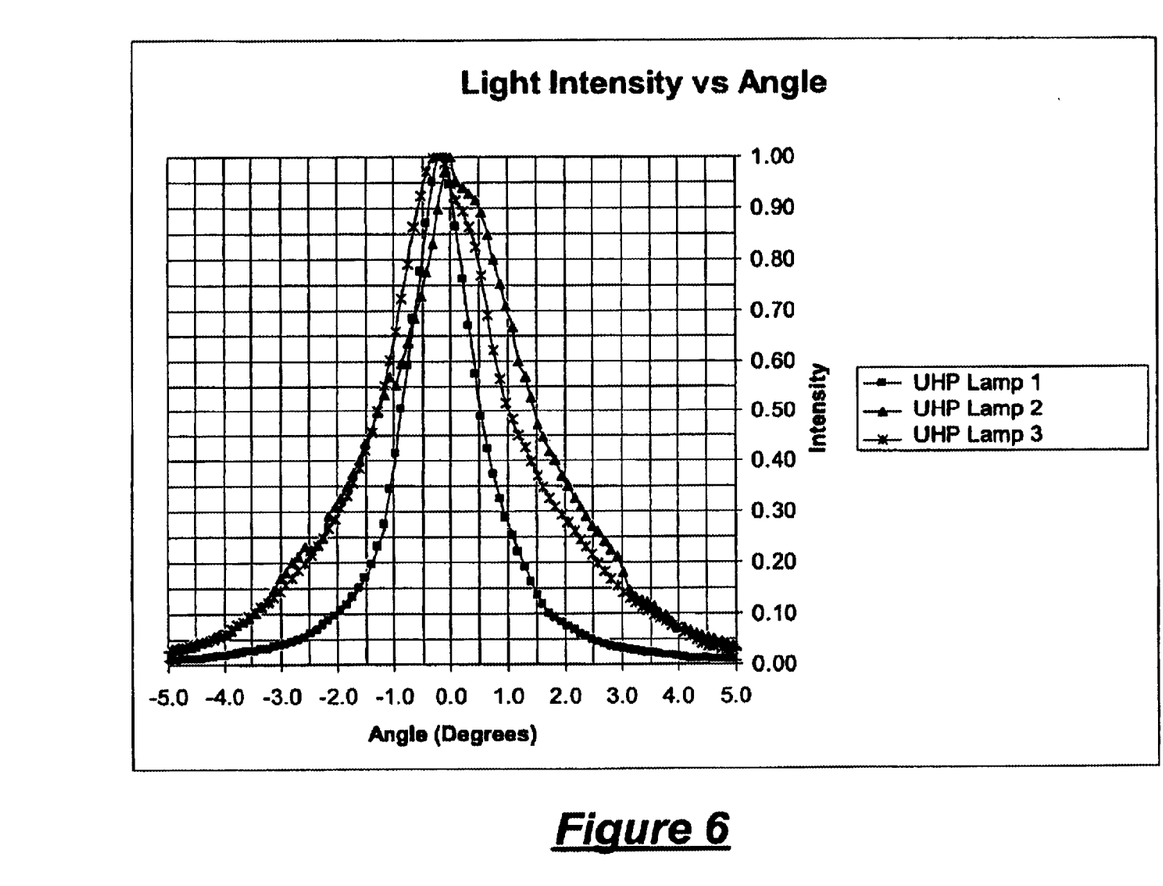
FIG. 6 is a plot of light intensity versus divergence angle for three different commercially available UHP lamps each placed in a parabolic reflector, which can be used to determine the maximum divergence angles associated with the lamps.

The maximum divergence angle of the light source can be determined as follows. FIG. 6 is a plot of light intensity versus divergence angle for three different commercially available UHP lamps each placed in a parabolic reflector, which can be used to determine the maximum divergence angles associated with the lamps. In the illustration in FIG. 6, each lamp has a focal length of approximately 7.0 mm but the arc lengths of the lamps vary from 1.0 to 1.3 mm. The plot in FIG. 6 can be generated by measuring the light intensity of the light source as a detector is moved across the center of a light spot formed at a distance from the light source. As shown in FIG. 6, 90% of the light is contained within a divergence angle of 0 to ±3 degrees. It can also be observed that the smaller the arc length, the smaller the total divergence angle.

Figures 7A, 7B:
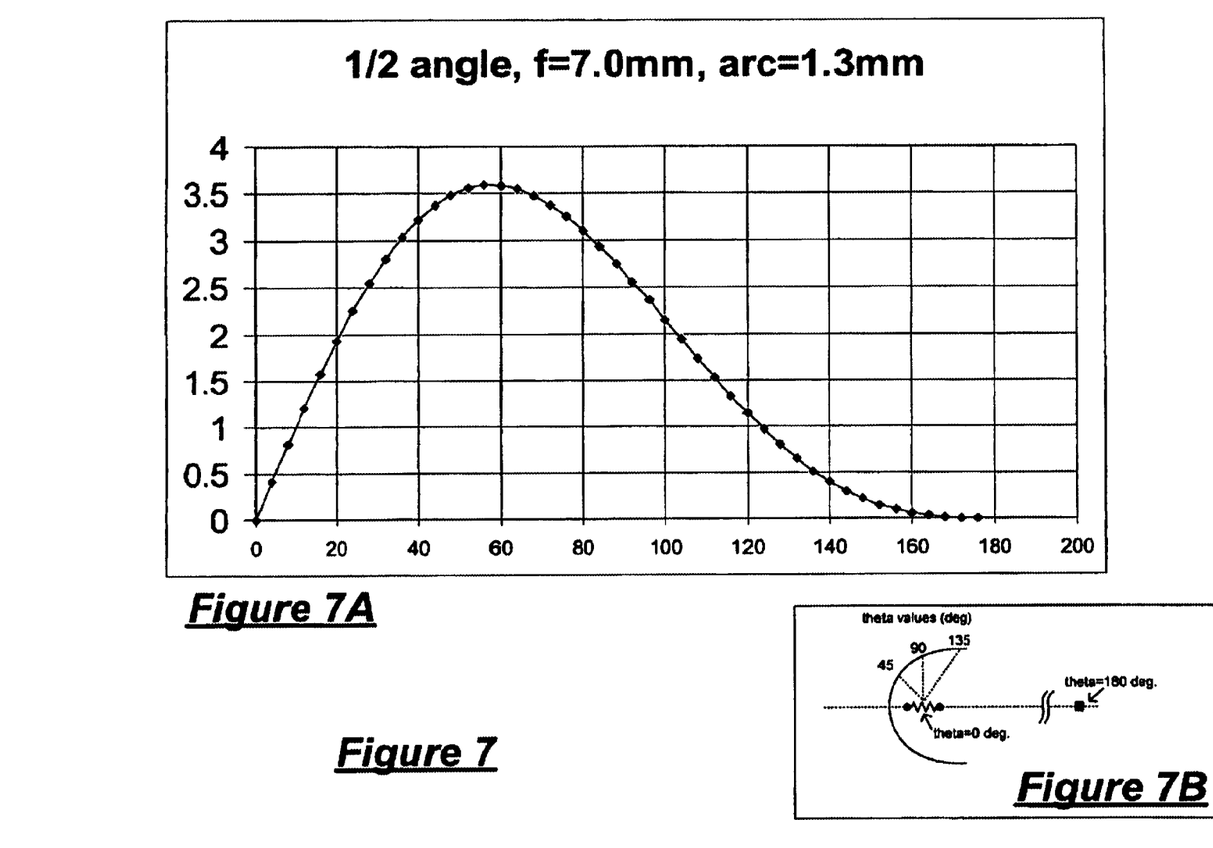
FIG. 7 is a plot of the divergence angle of the light beam reflected from the surface of a parabolic reflector at a position defined by the angle theta and the corresponding radius. The radius and theta define the parabolic surface in a polar coordinate system.

Besides determining the maximum beam divergence angle of the light source, the beam divergence angles at different positions of the reflected parallel beams of the light source are also determined. FIG. 7 is a plot of the maximum divergence angle as a function of polar angle on the surface of a parabolic reflector surrounding a UHP lamp, which can be used to determine the divergence angles at different positions of the light source. The plot in FIG. 7 is generated by calculating the divergence angle values for theta values between 0 and 180 degrees along the radial axis of the light emitting element (e.g. the UHP lamp). The calculation of the beam divergence values of a parabolic lamp along the radial axis is well known in the art. The insert in FIG. 7 illustrates the lamp and the radial axis values used in the calculations of the divergence angle plot. In the present description, theta of zero degree is at the vertex of the UHP lamp and theta of 180 degrees is on the z-axis in front of the lamp that should be at an infinite distance from the vertex. In a typical UHP lamp, the arc is formed between two electrodes lying on the z-axis. The physical size of the electrodes limits the light emission to theta of about 45 to 135 degrees. Thus, a typical parabolic reflector extends only to about 135 degrees around the arc in order to capture the usable light. As can be seen in the plot in FIG. 7, the beam divergence is smaller at the larger angles of 100 to 135 degrees. Thus, the light spots formed on the second lens array will be of a bigger size near the center of the lens array and of a smaller size near the edge of the lens array, as shown in FIG. 4.

The calculation of the divergence angles associated with the light source can be used not only in determining the size of the lenslets in the second lens array but can also be used to select a size for the outer wedge shaped lenslets so that the overall size of the second lens array is minimized. Specifically, because the light spot formed at the outer edge of the lens array will be of a smaller size, the radial dimension of the outer lenslets can be made smaller. By keeping the overall size of the second lens array as small as possible, all of the light emitted from the second lens array can fit inside the collection cone angle of the subsequent light collection aperture thereby further improving the light collection efficiency of the illumination system.

Next, the collection angle of the lenslet in the second lens array can be determined as follows. The maximum beam divergence angle (in unit degrees) that can be collected into an aperture by a lens can be calculated to a good approximation by the equation below:

$$\text{Max\_Divergence\_Coll} = (W/2)(1/fl)57.3 \quad (1)$$

where W is a dimension of the aperture and fl is the focal length of the lens. The 57.3 multiplier is used for converting a radian unit into degrees. Equation (1) can be used to calculate the collection angle required for the lenslets in the second lens array plate. In that case, W is the length or width of the wedge shaped lenslet and the maximum divergence angle that can be collected (the collection angle) in the radial and theta ($\theta$) directions for the lenslets can be calculated accordingly.

As described above, the collection angles, in the radial and theta directions, of the lenslets in the second lens array plate have to equal to at least the maximum divergence angles of the corresponding lenslets in the first lens array plate in order to collect all of the transmitted light from the first lens array. The maximum beam divergence for the lenslets in the first lens array can be determined using conventional means. Specifically, the maximum beam divergence of the lenslets in the first lens array depends on their position in the array. Generally, the further away from the center of the array, the smaller the total beam divergence angle. Furthermore, the collection angles of the lenslets in the second lens array plate have to match the maximum divergence angle of the light source so that a majority of the emitted light can be collected.

For example, in the present embodiment, the first lens array plate has lenslets of a dimension of 6.0×4.5 mm and a focal length of 90 mm. If the second lens array were constructed in the conventional manner, the lenslets would also be rectangularly shaped and have dimensions of 6.0×4.5 mm. Using equation (1) given above, the maximum divergence angle that could be collected by the corresponding lenslet in the second lens array would be about 2.0 degrees in the horizontal direction and about 1.5 degrees in the vertical direction. Thus, for the conventional lens array system, the collection angles of the lenslets in the second lens array have values that are significantly less than the 3 degrees maximum divergence angle of the UHP lamp as calculated above. In accordance with the present invention, wedge shaped lenslets are used where in the direction of large beam divergence, the dimension is elongated and in the direction of small beam divergence, the dimension is shortened.

Thus, to construct the second lens array so that all the arc images from the light source can be collected, the size of the lenslets in the second lens array is determined by matching the maximum collection angle of lenslets to the maximum divergence angle of the arc of the lamp. The matching of the lenslet sizes can be done experimentally or by modeling using the arc sizes. Referring to FIG. 4, it can be seen that the arc image projected by the first lens array is elongated and has a length about three times the width. Thus, the lenslets in the second lens array can be sized with a radial dimension that is three times the $\theta$ dimension. For instance, in FIG. 3, each wedge shaped lenslet has a dimension of 9 mm in the radial direction and 3 mm in the $\theta$ direction so as to collect the maximum amount of light. By using the equation given above, a maximum divergence angle of 3.0 degrees in the radial direction and about 1.0 degree in the $\theta$ direction is attained.

Finally, after optimizing the size of the individual lenslets in the second lens array for maximum light collection consistent with a smaller overall lens array size, the overall size of the second lens array plate is optimized to allow efficient light collection by the subsequent light collection aperture. Specifically, the overall size of the second lens array plate is chosen so as to fit the light transmitted through the second lens array within the collection cone angle of the subsequent light collection aperture. The collection cone angle is dictated by the engine optics of the illumination system and the illumination cone is also referred to as the f/# of the system. For a given lamp/lens array system, the cone angle can be readily calculated.

In the first example, assume the projection system includes a single lamp illumination system. Using a typical 250 W parabolic lamp, the area in front of the lamp that emits light can be measured. This area is known as the clear aperture of the lamp and has dimensions of approximately 50×55 mm in the present example. Further assuming that the set of lens arrays used has a focal length of 90 mm, the maximum cone angle can be calculated. First, the diagonal distance of the lamp's clear aperture (74 mm) is determined and the diagonal is divided by 2 (37 mm). The maximum collection cone angle is the angle whose tangent is 37 mm/90 mm which is about 22.4 degrees, or about f/1.31. In the present embodiment where a dual lamp configuration is used, the clear aperture dimension of the UHP lamps can be arranged to be 100×55 mm. In the dual lamp case, the collection cone angle is about 32.4 degrees at the diagonal corners or about f/0.93. In the case where the limiting f/# of the optics of the lens array is f/1.0, any light falling outside the 30 degrees collection cone angle will not be collected and will be lost.

The illumination system of the present invention can improve collection efficiency to a large degree. There are still losses due to the large collection cone angle of the system which can be minimized if desired. For instance, to minimize the collection cone angle of the system, the size of the reflectors can be reduced. In the present example, only the very corner lenslets of the second lens array have an f/# that is greater than the desired f/1.0 requirement.

The above detailed descriptions are provided to illustrate specific embodiments of the present invention and are not intended to be limiting. Numerous modifications and variations within the scope of the present invention are possible. The present invention is defined by the appended claims.

We claim:

1. An illumination system for illuminating an object, comprising:
   a light source including an illumination element emitting light rays and surrounded by a parabolic reflector for directing the light rays;
   a lens array system for collecting and focusing incident light rays from the light source, the lens array system comprising:
   a first lens array plate comprising a plurality of lenslets arranged in a matrix configuration; and
   a second lens array plate comprising a plurality of wedge shaped lenslets arranged in a radial pattern, each wedge shaped lenslet corresponding to a lenslet in the first lens array plate, the second lens array plate superimposing images of the first lens array plate on the object to be illuminated,
   wherein each wedge shaped lenslet in the second lens array plate has dimensions that are selected to provide a radial and theta collection angles matching the maximum divergence angle of the light source and the maximum divergence angles of the corresponding lenslet in the first lens array plate.

2. The illumination system of claim 1, wherein the lens array system directs light to a light integrating device for illuminating the object, the light integrating device comprising a light collection aperture having a first collection cone angle; and wherein the second lens array plate has dimensions selected to fit substantially all the transmitted light within the first collection cone angle of the light collection aperture.

3. The illumination system of claim 1 wherein each wedge shaped lenslet in the second lens array plate has a first dimension and a second dimension, the first dimension providing a collection angle in the radial direction matching the vertical maximum divergence angle of the corresponding lenslet in the first lens array plate and the second dimension providing a collection angle in the theta direction matching the horizontal maximum divergence angle of the corresponding lenslet in the first lens array plate.

4. The illumination system of claim 3, wherein each lenslet in the first lens array plate projects an image of the illumination element onto a corresponding lenslet in the second lens array plate, each wedge shaped lenslet in the second lens array plate disposed to collect substantially all of the light corresponding to the image of the illumination element.

5. The illumination system of claim 1 wherein the maximum divergence angle that can be collected by a lenslet in the first or the second lens array plate is given by: $(W/2)(1/fl)57.3$ where W is a dimension of the lenslet and fl is the focal length of the lenslet.

6. The illumination system of claim 1 wherein, each of the lenslets in the first lens array plate has a shape matching the aspect ratio of the object to be illuminated.

7. The illumination system of claim 1, wherein the illumination element comprises an UHP lamp.

8. A projector system, comprising:
a light source including a first illumination element and a second illumination element each emitting light rays and each surrounded by a parabolic reflector for directing the light rays onto an optical axis;
a first and second lens array systems each for collecting and focusing incident light, the first lens array system coordinated with the first illumination element and the second lens array system coordinated with the second illumination system, each of the first and second lens array systems comprising:
a first lens array plate comprising a plurality of lenslets arranged in a matrix configuration; and
a second lens array plate comprising a plurality of wedge shaped lenslets arranged in a radial pattern, each wedge shaped lenslet corresponding to a lenslet in the first lens array plate, the second lens array plate superimposing images of the first lens array plate;
wherein each wedge shaped lenslet in the second lens array plate has dimensions that are selected to provide a radial collection angle and a theta collection angle matching the maximum divergence angle of the light source and the maximum divergence angles of the corresponding lenslet in the first lens array plate;
a light integrating device including an input aperture for receiving superimposed light from the second lens array plate of each of the first lens array system and the second lens array system;
a color separating device disposed to receive light from the light integrating device and generate light in three primary color components; and
a first, second and third DMD panels each receiving light in a respective one of the primary color components and modulating the incident light to generate image light in a respective one of the primary color components.

9. The projection system of claim 8, wherein the light integrating device has a first collection cone angle and wherein the second lens array plate in each of the first and second lens array systems has dimensions selected to fit substantially all the transmitted light within the first collection cone angle of the light integrating device.

10. The projection system of claim 8 wherein each wedge shaped lenslet in the second lens array plate has a first dimension and a second dimension, the first dimension providing a collection angle in the radial direction matching the vertical maximum divergence angle of the corresponding lenslet in the first lens array plate and the second dimension providing a collection angle in the theta direction matching the horizontal maximum divergence angle of the corresponding lenslet in the first lens array plate.

11. The projection system of claim 8 wherein the maximum divergence angle that can be collected by a lenslet in the first and second lens array plates is given by: $(W/2)(1/fl)57.3$ where W is a dimension of the lenslet and fl is the focal length of the lenslet.

12. The projection system of claim 8 wherein each of the lenslets in the first lens array plate has a shape matching the aspect ratio of the first, second and third DMD panels.

13. The projection system of claim 8, further comprising:
a projection lens assembly for receiving and projecting superimposed image light from each of the first, second and third DMD panels.

14. The projection system of claim 8, wherein each of the first and second illumination elements comprises an UHP lamp.

15. The projection system of claim 8, further comprising a condenser lens disposed between the first and second lens array systems and the light integrating device, the condenser lens directing light from the first and second lens array systems to the input aperture of the light integrating device.

16. A projector system, comprising:
a light source including an illumination element emitting light rays and surrounded by a parabolic reflector for directing the light rays onto an optical axis;
a lens array system for collecting and focusing incident light, the lens array system comprising:
a first lens array plate comprising a plurality of lenslets arranged in a matrix configuration; and
a second lens array plate comprising a plurality of wedge shaped lenslets arranged in a radial pattern, each wedge shaped lenslet corresponding to a lenslet in the first lens array plate, the second lens array plate superimposing images of the first lens array plate;
wherein each wedge shaped lenslet in the second lens array plate has dimensions that are selected to provide a radial collection angle and a theta collection angle matching the maximum divergence angle of the light source and the maximum divergence angles of the corresponding lenslet in the first lens array plate;
a light integrating device including an input aperture for receiving superimposed light from the second lens array plate of the lens array system; and
a DMD panel receiving light from the light integrating device and modulating the light to generate image light.

17. The projection system of claim 16, further comprising:
- a color separating device disposed to receive light from the light integrating device and sequentially generate light in three primary color components;
- wherein the DMD panel receives light from the color separating device in the three primary color components and modulates the light to generate image light in the three primary color components.

18. The projection system of claim 16, wherein the light integrating device has a first collection cone angle and wherein the second lens array plate in each of the first and second lens array systems has dimensions selected to fit substantially all the transmitted light within the first collection cone angle of the light integrating device.

19. The projection system of claim 16, wherein each of the lenslets in the first lens array has a shape matching the aspect ratio of the DMD panel.

20. The projection system of claim 16 wherein the maximum divergence angle that can be collected by a lenslet in the first and second lens array plates is given by: $(W/2)(1/fl)57.3$ where W is a dimension of the lenslet and fl is the focal length of the lenslet.

21. The projection system of claim 16, further comprising:
- a projection lens assembly for receiving and projecting image light from the DMD panel.

22. The projection system of claim 16, further comprising a condenser lens disposed between the lens array system and the light integrating device, the condenser lens directing light from the first and second lens array systems to the input aperture of the light integrating device.

* * * * *